(12) United States Patent
Kang (10) Patent No.: US 6,205,530 B1
(45) Date of Patent: Mar. 20, 2001

(54) ADDRESS TRANSLATION UNIT SUPPORTING VARIABLE PAGE SIZES (75) Inventor: Hoai Sig Kang, Kyoungki-do (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/073,968

(22) Filed: May 7, 1998

(30) Foreign Application Priority Data

May 8, 1997 (KR) .................................................. 97-17723

(51) Int. Cl.[7] .................................................. G06F 12/00
(52) U.S. Cl. .................... 711/202; 711/206; 711/203; 711/205; 711/212; 711/211
(58) Field of Search ................................... 711/202, 203, 711/206, 205, 212, 211, 209

(56) References Cited

U.S. PATENT DOCUMENTS

| 5,263,140 | * | 11/1993 | Riordan | 395/400 |
| 5,479,627 | * | 12/1995 | Khalidi et al. | 395/415 |
| 5,526,504 | * | 6/1996 | Hsu et al. | 395/417 |
| 5,530,824 | * | 6/1996 | Peng et al. | 395/417 |
| 5,604,879 | * | 2/1997 | Beavers et al. | 395/417 |
| 5,617,554 | * | 4/1997 | Alpert et al. | 395/418 |
| 5,752,275 | * | 5/1998 | Hammond | 711/207 |
| 5,784,707 | * | 7/1998 | Khalidi et al. | 711/206 |
| 5,796,978 | * | 8/1998 | Yoshioka et al. | 395/416 |
| 5,802,341 | * | 9/1998 | Kline et al. | 395/419 |
| 5,835,963 | * | 11/1998 | Yoshioka et al. | 711/207 |
| 5,907,867 | * | 5/1999 | Shinbo et al. | 711/207 |
| 5,946,716 | * | 8/1999 | Karp et al. | 711/207 |
| 5,956,756 | * | 9/1999 | Khalidi et al. | 711/207 |
| 5,963,984 | * | 10/1999 | Garibay, Jr. et al. | 711/206 |

* cited by examiner

Primary Examiner—Do Yoo
Assistant Examiner—Kimberly McLean
(74) Attorney, Agent, or Firm—Jacobson, Price, Holman & Stern, PLLC (57) ABSTRACT An address translation unit for supporting multiple page modes, with each page mode having a different page size. The address translation unit includes a tag interface unit for outputting effective tag data in response to a page mode select signal, a tag memory for storing tag data and for comparing the effective tag data with previously stored tag data to generate a comparison signal in response to a word signal and a write control signal, a data interface unit for outputting effective physical data in response to the page mode select signal, a data memory for storing effective physical data from the data interface unit and for outputting a converted physical address in response to the word signal, the write control signal and the comparison signal, a decoder interface unit for receiving a part of a linear address in response to a page mode signal and for outputting the part of the linear address as an entry index signal, and a decoding unit for decoding the part of the linear address and outputting the word signal selecting an entry to the tag memory and the data memory in response to the entry index signal, the write control signal and a write way signal.

7 Claims, 5 Drawing Sheets

ADDRESS TRANSLATION UNIT SUPPORTING VARIABLE PAGE SIZES

BACKGROUND OF THE INVENTION

1. Field of the Invention

The present invention relates to an address translation unit which supports a variety of page sizes.

2. Description of the Related Art

In managing partitioning of a segment into page sizes in a memory management unit (MMU), the address translation unit generates a 20-bit physical address in order to support a 4K page size because of using upper 20 bits of a 32-bit linear address for partitioning the page; a 12-bit physical address is generated in order to support a 1M page size because of using upper 12 bits of the 32-bit linear address for partitioning the page; a 11-bit physical address is generated in order to support a 2M page size because of using upper 11 bits of the 32-bit linear address for partitioning the page; and a 10-bit physical address is generated in order to support a 4M page size because of using upper 10 bits of the 32-bit linear address for partitioning the page.

Figure 1:
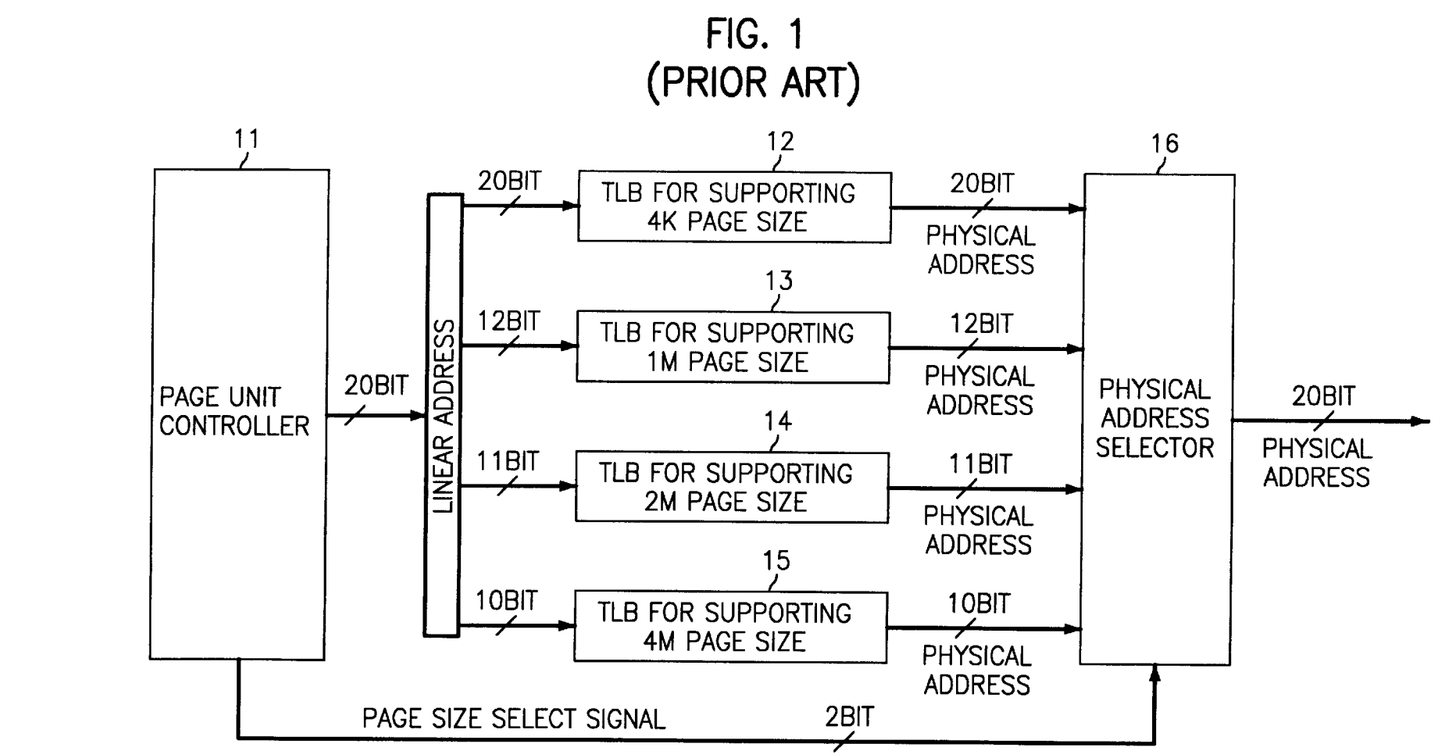
FIG. 1 is a block diagram illustrating a conventional address translation unit.

FIG. 1 is a block diagram illustrating a conventional address translation unit supporting the variety of page sizes in the MMU. As shown in FIG. 1, the conventional microprocessor has a plurality of translation look aside buffer (TLB) 12, 13, 14 and 15 for supporting the page sizes of 4K, 1M, 2M, and 4M bytes respectively.

And, a page unit controller 11 provides the corresponding TLB with the corresponding linear address of the 32-bit linear address in response to the page sizes, and applies a 2-bit page size select signal to a physical address selector 16.

The physical address selector 16 selects one of the respective physical addresses outputted from each TLB in response to the page size select signal applied from the page unit controller 11 and outputs the selected physical address.

As described above, in the conventional address translation unit, routing and gate loads are bigger because the 32-bit linear address which was generated at the MMU is inputted to every TLB, and the conventional address translation unit needs the physical address selector in order to select one of the respective physical addresses which are outputted from each TLB. Therefore, the conventional address translation unit is difficult to the address translation of high speed and needs much area in order to realize TLBs.

SUMMARY OF THE INVENTION

It is, therefore, an object of the present invention to provide an address translation unit which carries out the address translation with variable page sizes at high speed, and which can be realized to minimum area.

BRIEF DESCRIPTION OF THE DRAWINGS

The present invention will be more fully apparent from the following description of the embodiments with reference to the accompanying drawings, in which.

DETAILED DESCRIPTION OF THE PREFERRED EMBODIMENTS

In accordance with the present invention, there is disclosed an address translation unit comprising: a tag interface means for outputting an effective tag data in response to a page mode signal with receiving a data requested by a page mode supporting the most page count among a plurality of page modes from a linear address; a tag memory for outputting a compared result signal after comparing the effective tag data with the tag data or for writing the tag data from the tag interface means in response to a word signal and a write control signal; a data interface means for outputting an effective physical data in response to the page mode signal with receiving a data requested by the page mode supporting the most page count among a plurality of page modes from a physical address; a data memory for outputting a converted physical address in the linear address storing or stored the effective physical data from the data interface means in response to the word signal, the write signal and the compared result signal; a decoder interface means for receiving some of the linear address in response to the number of entries and the page mode signal and outputting an entry index signal in response to the page mode signal; and a decoding means for outputting the word signal selecting the entry in response to the entry index signal, the write control signal and the write way signal.

Generally, the linear address is composed of an offset field representing the page size and a page field partitioning the page, and each field size depends on the page size.

In case of supporting the 4K page size in the microprocessor, the 32-bit linear address is composed of the lower 12 bits of the offset field and the upper 20 bits of the page field. Here, in order to translate the upper 20 bits of the linear address into the 20-bit physical address, a tag memory in the address translation unit receives and stores the upper 17 bits of the page field (here, the remaining 3 bits of the page field are used as a decoding index value for selecting one of among 8 entries), a data memory receives and stores the 20-bit physical address.

In case of supporting the 1M page size in the microprocessor, the 32-bit linear address is composed of the lower 20 bits of the offset field and the upper 12 bits of the page field. The tag memory receives and stores the upper 9 bits of the page field (here, the remaining 3 bits of the page field are used as the decoding index value for selecting one of among 8 entries), the data memory receives and stores the 12-bit physical address.

In case of supporting the 2M page size in the microprocessor, the 32-bit linear address is composed of the lower 21 bits of the offset field and the upper 11 bits of the page field. The tag memory receives and stores the upper 8 bits of the page field (here, the remaining 3 bits of the page field are used as the decoding index value for selecting one of among 8 entries), the data memory receives and stores the 11-bit physical address.

And, in case of supporting the 4M page size in the micro-processor, the 32-bit linear address is composed of the lower 22 bits of the offset field and the upper 10 bits of the page field. The tag memory receives and stores the upper 7 bits of the page field (here, the remaining 3 bits of the page field are used as the decoding index value for selecting one of among 8 entries), the data memory receives and stores the 10-bit physical address.

Although the preferred embodiment of the address translation unit according to the present invention is constituted in order to support the 4K page size, the address translation unit can support the page sizes of 1M, 2M, and 4M altogether. In the constitution of the present invention, in case that the address translation is performed with the page sizes of 1M, 2M, and 4M, no by difference bit lines by difference of a different data length are generated. Therefore, in the present invention, such bit lines are filled with the logical "0", such that the data length is maintained the same as that of the 4K page size. In some case, such bit lines may be filled with the logical "1".

Hereinafter, the preferred embodiment of the present invention will be described in detail referring to the accompanying drawings from FIG. 2 to FIG. 6.

Figure 2:
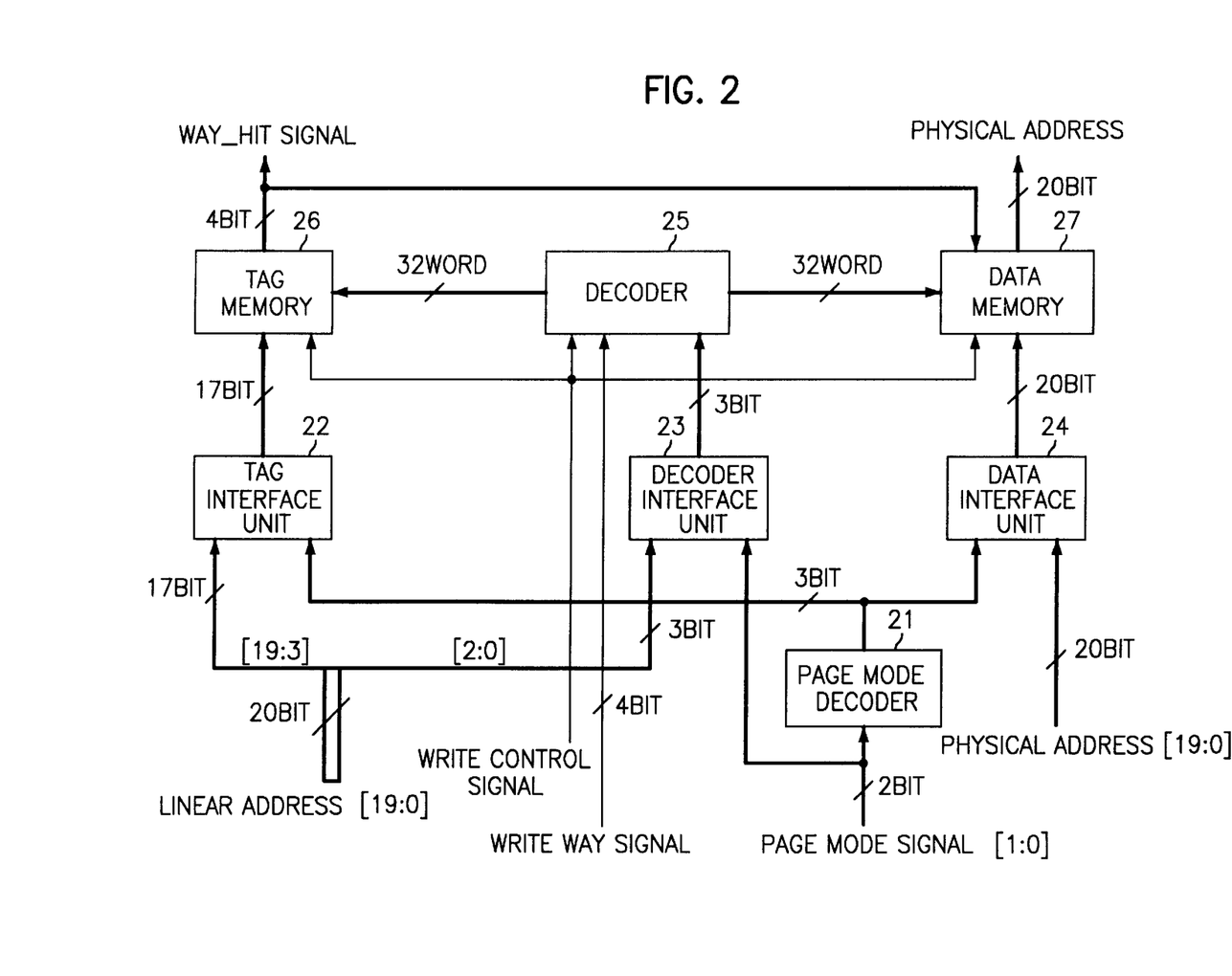
FIG. 2 is a block diagram illustrating an address translation unit according to the present invention.

FIG. 2 is a block diagram illustrating the address translation unit according to the present invention. As shown in FIG. 2, the address translation unit according to the present invention includes a tag memory 26, a decoder 25, a data memory 27, a page mode decoder 21 decoding a page mode signal in order to provide a page mode select signal, a tag interface unit 22 providing input to the tag memory 26 by selecting one part of the linear address according to the page mode select signal in order to partition the page, a decoder interface unit 23 providing input to the decoder 25 by selecting a second part of the linear address according to the page mode signal inputted from the external circuit in order to distinguish entries, and a data interface unit 24 providing input to the data memory 27 by selecting one part of the physical address according to the page mode select signal in order to partition the page.

The address translation unit according to the present invention illustrated in FIG. 2 is a case of being constituted a 4-way having 8 entries respectively.

The page mode decoder 21 carries out a function which selects one page size mode among the page sizes of 4K, 1M, 2M, and 4M by decoding the page mode signal inputted from a controller of the MMU. Here, the page mode decoder 21 may not be necessary by providing directly the tag interface unit 22 and the data interface unit 24 with the decoded page mode signal (namely, the page mode select signal) in the MMU controller in accordance with an implementing method.

The tag interface unit 22 receives the upper 17 bits of the linear address and provides the tag memory 26 with all of the received linear address when the page mode select signal inputted from the page mode decoder 21 represents the operation mode of the 4K page size. When the operation mode is of the 1M page size, the tag interface unit 22 provides the tag memory 26 with the upper 9 bits of the received linear address, and the remaining lower 8 bits are filled with all "0". And, when the operation mode is of the 2M page size, the tag interface unit 22 provides the tag memory 26 with the upper 8 bits of the received linear address and the remaining lower 9 bits are filled with all "0". Also, when the operation mode is of the 4M page size, the tag interface unit 22 provides the tag memory 26 with the upper 7 bits of the received linear address and the remaining lower 10 bits are filled with all "0".

The data interface unit 24 provides a data (physical address) length corresponding to the page size when writing the page physical address to the data memory 27; its operation is the same as that of the tag interface unit 22.

That is, when the operation mode is of the 4K page size, the data interface unit 24 provides the data memory 27 with all of the received 20-bit physical address. When the operation mode is of the 1M page size, the data interface unit 24 provides the data memory 27 with the upper 12 bits of the received 20-bit physical address, and the remaining lower 8 bits are filled with all "0". When the operation mode is of the 2M page size, the data interface unit 24 provides the data memory 27 with the upper 11 bits of the received 20-bit physical address, and the remaining lower 9 bits are filled with all "0". And, when the operation mode is of the 4M page size, the data interface 24 provides the data memory 27 with the upper 10 bits of the received 20-bit physical address, and the remaining lower 10 bits are filled with all "0".

The decoder interface unit 23 selects and provides 3 bits of the upper 20-bit linear address [19:0] in response to the page mode signal which is inputted from the external circuit to decoder 25, decoding the 3 bits in order to select from the 8 entries. That is, the decoder interface unit 23 provides the decoder 25 with the lower 3 bits ([2:0] of the linear address) of the 20-bit linear address [19:0] when the operation mode is of the 4K page size. When the operation mode is of the 1M page size, the decoder interface unit 23 provides the decoder 25 with the linear address [10:8] of the 20-bit linear address. And when the operation mode is of the 2M page size, the decoder interface unit 23 provides the decoder 25 with the linear address [11:9] of the 20-bit linear address. Also, when the operation mode is of the 4M page size, the decoder interface unit 23 provides the decoder 25 with the linear address [12:10] of the 20-bit linear address.

The tag memory 26 stores the upper 17 bits of the linear address in response to the write control signal, compares the stored 17-bit linear addresses with the upper 17 bits of the linear address inputted from the tag interface unit 22 in the search operation mode, and outputs a way_hit signal depending on the compared result. That is, if the upper 17 bits of the linear address is equal to match one of the stored 17-bit linear addresses, the way_hit signal is activated. The tag memory 26 is equivalent to a conventional function described above. The present invention performs whether the size of the linear address inputted from the tag interface unit is changed due to a change of the page size, performing an operation mode of the biggest 17-bit (for the 4K page size), to support simultaneously the page sizes of 1M, 2M and 4M.

The data memory 27 stores the physical address corresponding to the linear address and outputs the physical address in response to a decoded result of the decoder 25 and the way_hit signal outputted by the tag memory 26 in the search operation mode. The data memory 27 carries out input and output data sizes as an operation mode of the biggest 20-bit (for the 4K page size), and supports simultaneously the page modes of 1M (it uses 9 bits), 2M (it uses 8 bits) and 4M (it uses 7 bits).

The decoder 25 receives as many lower bits of the linear address as necessary for the entry number that supports the address translation unit, decodes the lower bits, and enables the corresponding word line in both the tag memory 26 and the data memory 27. Referring to FIG. 2, the address translation unit, which supports 8 entries according to the present invention, needs the linear address of 3 bits for decoding.

If the write control signal enables, the decoder 25 activates the corresponding word line among 32 word lines in response to the 8 decoded signals of the inputted 3-bit linear address and a write_way signal [3:0] and provides the word line to both the tag memory 26 and the data memory 27.

And, if the write control signal disables, the decoder 25 generates signals of the 32 word lines by copying the 8 decoded signals four times continuously and activating 4 word lines among the 32 word lines, which are provided to the tag memory 26 and the data memory 27.

Figure 3:
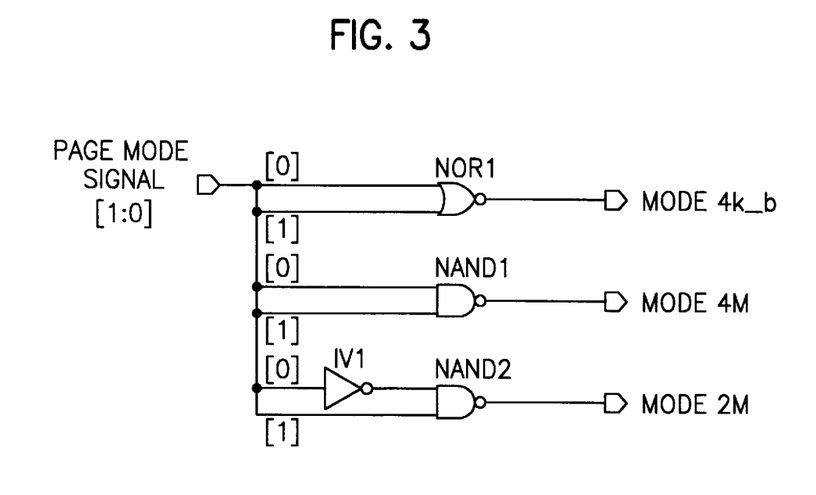
FIG. 3 is a block diagram illustrating a page mode decoder according to the present invention.

FIG. 3 is a block diagram illustrating the preferred embodiment of the page mode decoder in accordance with the present invention. As shown in FIG. 3, the page mode decoder 21 generates the 3-bit page mode select signal (mode 4K_b, mode 2M, mode 4M), in response to the 2-bit page mode signal inputted from the external circuit and outputs the 3-bit page mode select signal to the tag interface unit 22 and the data interface unit 24.

Here, when the page mode signal inputted from the external circuit is "00", it represents the 4K page mode, a page mode signal of "01" represents the 1M page mode, a page mode signal of "10" represents does the 2M page mode, and a page mode signal of "11" represents does the 4M page mode, respectively.

Therefore, when the page mode signal [1:0] inputted from the external circuit is "00", as a mode 4K-b signal outputted by NOR gate NOR1, a mode 4M signal outputted by NAND gate NAND1 and a mode 2M signal outputted by NAND gate NAND2 are "high" respectively, such case represents the operation mode of the 4K page.

Also, when the page mode signal [1:0] inputted from the external circuit is "01", as the mode 4K-b signal outputted by NOR gate NOR1 is "low", the mode 4M signal outputted by NAND gate NAND1 and the mode 2M signal outputted by NAND gate NAND2 are "high" respectively, such case represents the operation mode of the 1M page.

And, when the page mode signal [1:0] inputted from the external circuit is "10", as the mode 4K-b signal outputted by NOR1 gate and the mode 2M signal outputted by NAND gate NAND2 are "low" respectively, and the mode 4M signal outputted by NAND gate NAND1 is "high", such case represents the operation mode of the 2M page. Here, when the page mode signal is "10", the output of NAND gate NAND2 is all "low" since "0" by inverter IV1 is reversed to "1".

The last, when a page mode signal [1:0] inputted from the external circuit is "11", as the mode 4K-b signal outputted by NOR gate NOR1 and the mode 4M signal outputted by NAND gate NAND1 are "low" respectively, and the mode 2M signal outputted by NAND gate NAND2 is "high", such case represents the operation mode of the 4M page.

Figure 4:
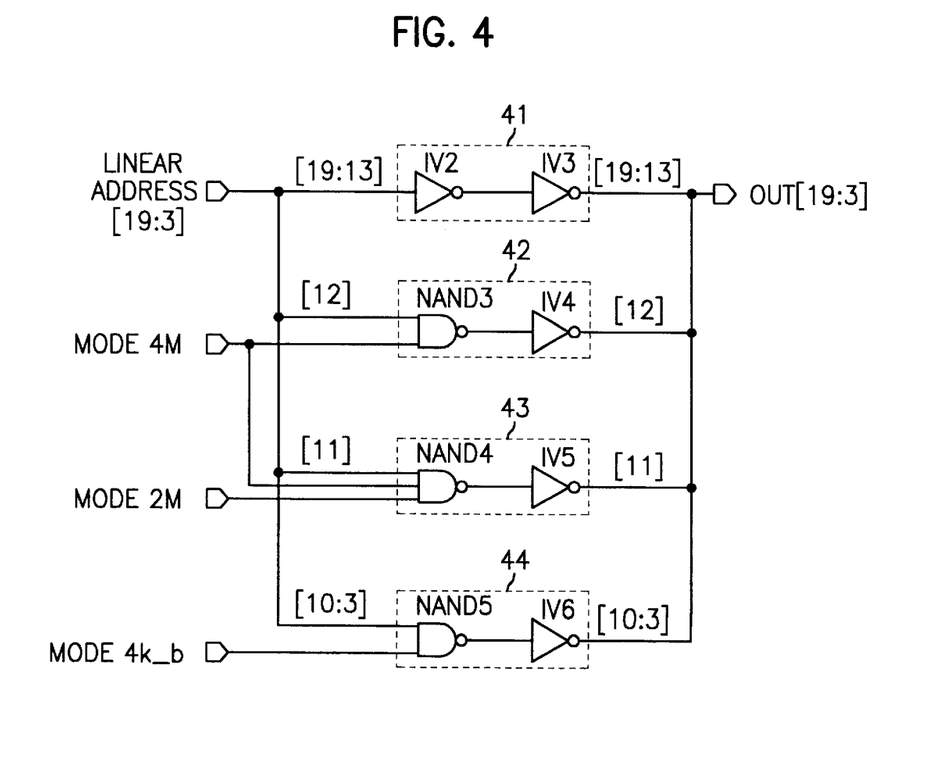
FIG. 4 is a block diagram illustrating a tag interface unit according to the present invention.

FIG. 4 is a block diagram illustrating the preferred embodiment of the tag interface unit in accordance with the present invention.

The tag interface unit 22 includes a delaying unit 41 outputting with a delay the upper 7 bits of the 17-bit linear addresses, an address value deciding unit 42 which decides an output value of the 17-bit linear address to be outputted, in combination with the lower one bit [12] following the linear address inputted to the delaying unit 41 among the 17-bit linear address inputted from the external circuit and the mode 4M signal inputted from the page mode decoder 21, an address value deciding unit 43 which decides an output value of the linear address, in combination with the mode 4M signal, the mode 2M signal inputted from the page mode decoder 21 and the lower one bit [8] following the linear address inputted to the address value deciding unit 42 among the 17-bit linear addresses inputted from the external circuit, and an address value deciding unit 44 which decides an output value of the 17-bit linear address, in combination with the mode 4K_b signal inputted from a page mode decoder 21 and the lower 8 bits of the 17-bit linear addresses inputted form the external circuit.

The operation of the tag interface unit 22 having structural elements described above will be described in reference to FIG. 4.

As shown in FIG. 4, delaying unit 41 is composed of two inverters IV2, IV3 connected in series. Each address value deciding unit 42, 43 and 44 includes of one NAND gate and one inverter gate respectively. The delaying unit 41 delays and outputs the upper 7 bits of the 17-bit linear address. The NAND gate NAND3 of the address value deciding unit 42 combines the linear address [12] of the 17-bit linear address with the mode 4M signal inputted from the page mode decoder 21, the combined signal is outputted after being reversed by the inverter gate IV4. That is, when the mode 4M signal or the mode 2M signal is low, the address value deciding unit 42 outputs the value of "0" regardless of the inputted linear address.

The NAND gate NAND4 of the address value deciding unit 43 combines the linear address [11] of the 17-bit linear address with both the mode 4M signal and the mode 2M signal inputted from the page mode decoder 21, the combined signal is outputted after being reversed by the inverter gate IV5. That is, when the mode 4M signal or the mode 2M signal is low, the address value deciding unit 43 outputs the value of "0" regardless of the inputted linear address. The NAND gate NAND5 of the address value deciding unit 44 combines the lower 8 bits [10:3] of the 17-bit linear address with the mode 4K_b signal inputted from the page mode decoder 21, the combined output is outputted after being reversed by the inverter gate IV6. That is, when the mode 4K_b signal is "low", the address value deciding unit 44 outputs the value of "0" regardless of the inputted linear address.

Accordingly, when change operating in the 4K page mode, as the mode 4M signal, the mode 2M signal and the mode 4K_b signal are to be all "high", the unchanged value of the inputted 17-bit linear address is outputted. And, when operating in the 1M page mode, as the mode 4K_b signal is to be "low" value, the lower 8 bits [10:3] of the inputted 17-bit linear address are converted to all "0" value, and are outputted. The remaining bits [19:11] of the inputted 17-bit linear address are transferred. Also, when operating in the 2M page mode, as the mode 2M signal and the mode 4K_b signal are to be all "low" value, the lower 9 bits [11:3] of the 17-bit linear address are converted to all "0" value, and are outputted. The upper 8 bits [19:12] are transferred. And, in case of operating as the 4M page mode, as the mode 4M signal and the mode 4K_b signal are to be "low" value, the lower 10 bits [12:3] of the 17-bit linear address are converted to all "0" value, and are outputted. The upper 7 bits [19:13] are transferred.

Figure 5:
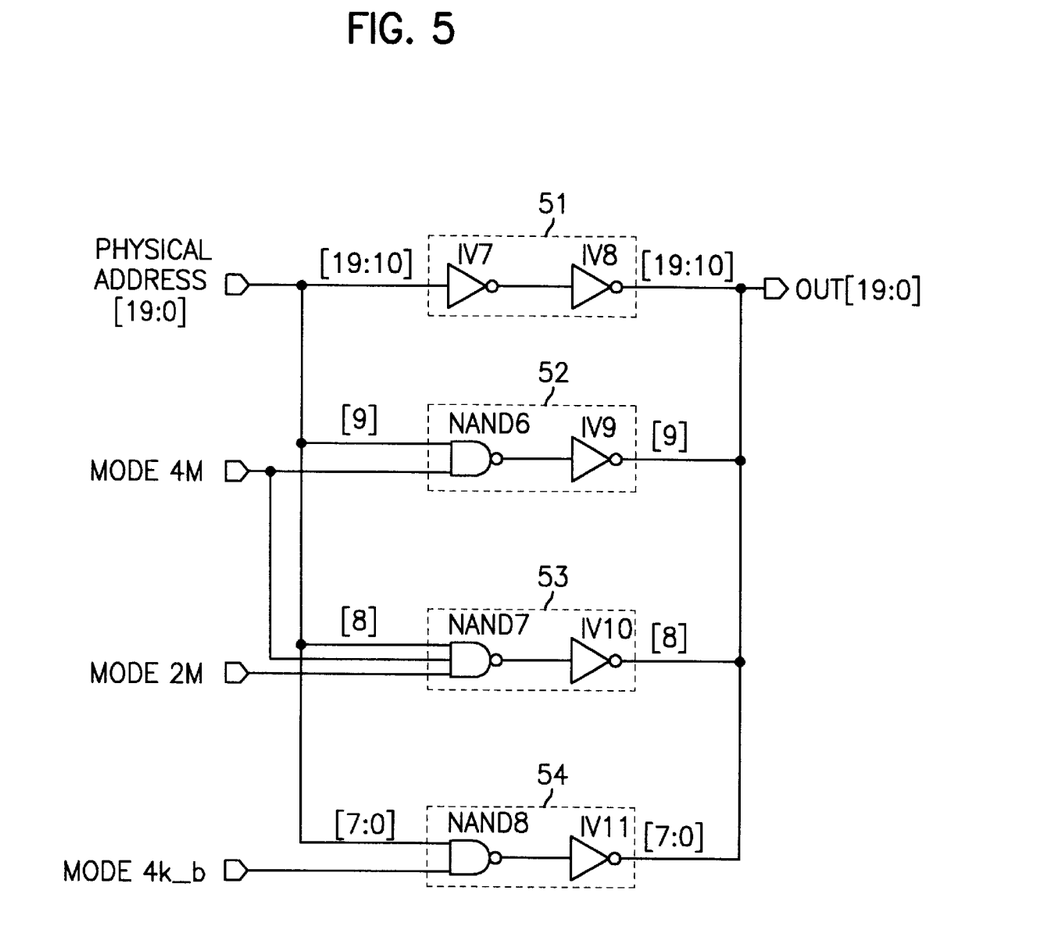
FIG. 5 is a block diagram illustrating a data interface unit according to the present invention.

FIG. 5 is a block diagram illustrating the preferred embodiment of the data interface unit in accordance with the present invention. The operation and structural elements of the data interface unit 24 are the same as that of the tag interface unit 22.

The data interface unit 24 includes a delaying unit 51 outputting with a delay the upper 10 bits of the 20-bit physical address, an address value deciding unit 52 which decides an output value of the 20-bit physical address to be outputted, in combination with the lower one bit [9] following the physical address inputted to the delaying unit 51 among the 20-bit physical address inputted from the external circuit and the mode 4M signal inputted from the page mode decoder 21, an address value deciding unit 53 which decides the output value of the physical address, in combination with the mode 4M signal, the mode 2M signal inputted from the page mode decoder 21 and the lower one bit [8] following the physical address inputted to the address value deciding unit 52 among the 20-bit physical addresses inputted from the external circuit, and an address value deciding unit 54 which decides an output value of the 20-bit physical address, in combination with the mode 4K_b signal inputted from a page mode decoder 21 and the lower 8 bits [7:0] of the 20-bit physical addresses inputted from the external circuit.

As shown in FIG. 5, delaying unit 51 is composed of two inverters IV7, IV8 connected in series. Each address value deciding unit 52, 53 and 54 consists of one NAND gate and one inverter gate respectively.

Accordingly, when operating in the 4K page mode, as the mode 4M signal, the mode 2M signal and the mode 4K_b signal are to be all "high", the unchanged value of the inputted 20-bit physical address is outputted. And, when operating in the 1M page mode, as the mode 4K_b signal is to be "low" value, the lower 8 bits [7:0] of the inputted 20-bit physical address are converted to all "0" value, and are outputted. The remaining bits [19:8] of the inputted 20-bit physical address are transferred. Also, when operating in the 2M page mode, as the mode 2M signal and the mode 4K_b signal are to be all "low" value, the lower 9 bits [8:0] of the 20-bit physical address are converted to all "0" value, and are outputted. The upper 11 bits [19:9] are transferred. And, when operating in the 4M page mode, as the mode 4M signal and the mode 4K_b signal are to be "low" value, the lower 10 bits [9:0] of the 20-bit physical address are converted to all "0" value, and are outputted. The upper 10 bits [19:10] are transferred.

Figure 6:
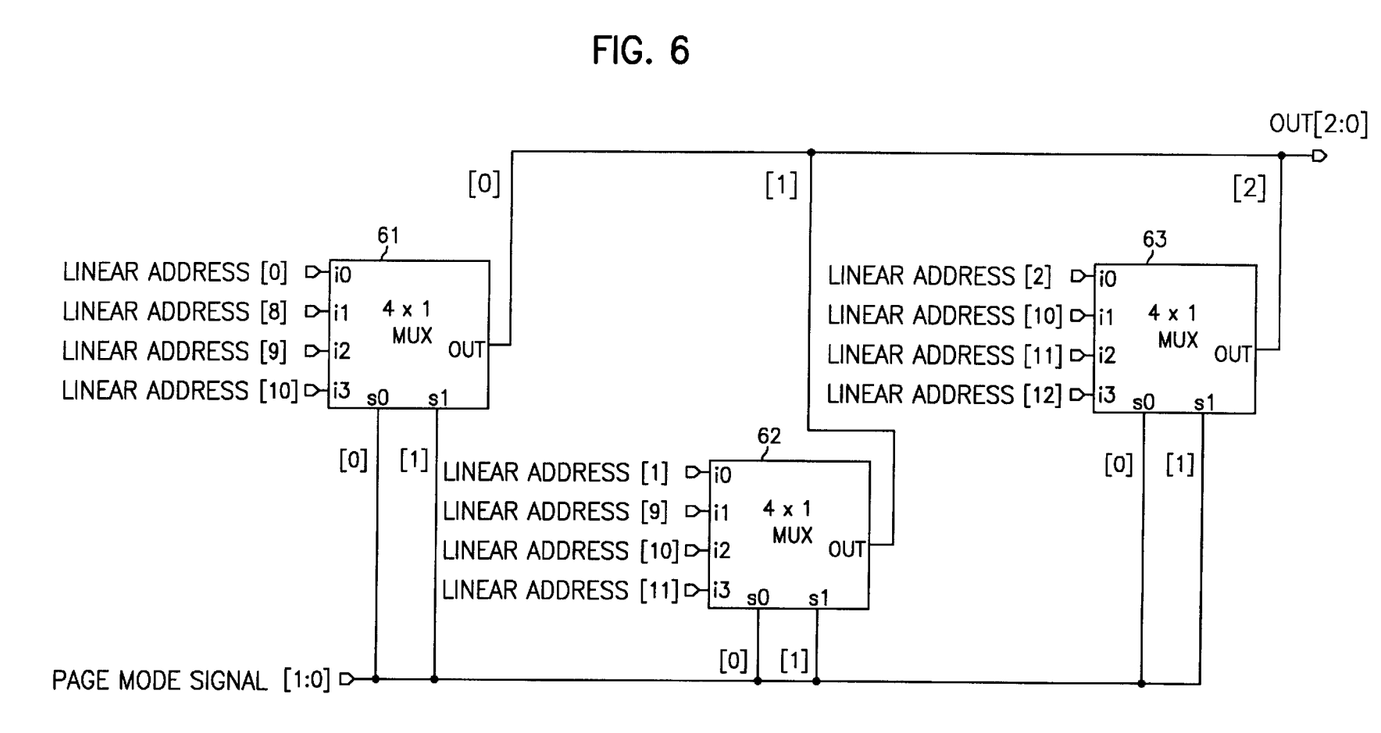
FIG. 6 is a block diagram illustrating a decoder interface unit according to the present invention.

FIG. 6 is a block diagram illustrating the preferred embodiment of the decoder interface unit in accordance with the present invention.

As shown in FIG. 6, when the address translation unit supports 8 entries, the decoder 25 receives the lower 3 bits of the linear address, which change depending on the page size, and generates the decoded signal. And, the decoder interface unit 23 selects the lower 3 bits of the linear address, which changes a position depending on page mode, and outputs to the decoder 25.

The decoder interface unit 23 according to the present invention consists of three 4×1 multiplexers 61, 62 and 63, the page mode signal [1:0] inputted from the external circuit is used as a select control signal.

As described above, when the page mode signal [1:0] is "00", it represents the 4K page mode, "01" represents does the 1M page mode, "10" represents the 4K page mode, and for "11" represents the 4K page mode.

A multiplexer 61 receives the linear address [0], the linear address [8], the linear address [9] and the linear address [10] as an input.

And, a multiplexer 62 receives the linear address [1], the linear address [9], the linear address [10] and the linear address [11] as an input.

Also, a mutiplexer 63 receives the linear address [2], the linear address [10], the linear address [11], and the linear address [12] as an input.

Accordingly, when representing the 4k page mode, as the inputted page mode signal is "00", the linear address [2:0] is selected by multiplexer 61, 62 and 63.

When representing the 1M page mode, as the inputted page mode signal is "01", the linear address [10:8] is selected by multiplexer 61, 62 and 63.

And, when representing the 2M page mode, as inputted page mode signal is "10", the linear address [11:9] is selected by multiplexer 61, 62 and 63.

Also, when representing the 4M page mode, as the inputted page mode signal is "11", the linear address [12:10] is selected by multiplexer 61, 62 and 63.

Although the present invention explains the address translation unit which supports the 8 entries as an example, it is applicable to address translation units of 16, 32 and 64 entries. The address translation unit can be realized as being different the entry number which is supported according to the page mode as 4K, 1M, 2M, and 4M page modes support 32, 16, 8, 8 entries respectively.

According to the present invention, as described above, the address translation unit which is constituted a hardware supporting the smallest page size among a plurality of page modes can support a variety of page sizes and can be realized in a minimum area as a consequence of doing address translation by selecting the linear address according to page modes. And, as a path of the address translation is simplified, the address is translated at high speed.

Also, in case of implementing the MMU of the microprocessor according to the present invention, it is possible to reduce complexity and to improve performance.

Although the preferred embodiments of the present invention have been disclosed for illustrative purposes, those skilled in the art will appreciate that various modifications, additions and substitutions are possible, without departing from the scope and the spirit of the present invention as disclosed in the accompanying claims.

What is claimed is:

1. An address translation unit for supporting a plurality of page modes, each having a different size, comprising:

a tag interface means for receiving, from a linear address, data requested by a page mode supporting a highest page count among a plurality of page modes and for outputting effective tag data in response to a page mode select signal;

a tag memory for storing the effective tag data from the tag interface means and for outputting a comparison signal after comparing the effective tag data with a previously stored tag data in response to a word signal and a write control signal;

a data interface means for receiving, from a physical address, data requested by the page mode supporting the highest page count among the plurality of page modes and for outputting effective physical data in response to the page mode select signal;

a data memory for storing the effective physical data from the data interface means and for outputting a converted physical address corresponding to the linear address in response to the word signal, the write control signal and the comparison signal;

a decoder interface means for receiving a part of the linear address corresponding to an entry number in response to a page mode signal, and for outputting the part of the linear address as an entry index signal, wherein the entry number is a number supported by the address translation unit;

a decoding means for decoding the part of the linear address from the decoder interface means and for outputting the word signal selecting an entry to the tag memory and the data memory in response to the entry index signal, the write control signal and a write way signal;

page mode decoding means for decoding the page mode signal and for outputting the page mode select signal to the tag interface means and the data interface means, said page mode decoding means including, a NOR means for outputting a first control signal which represents a first page mode by NORing each bit of the page mode signal inputted from an external circuit;

a first NAND means for outputting a second control signal which represents a second page mode by NANDing each bit of the page mode signal inputted from the external circuit; and a second NAND means for outputting a third control signal which represents a third page mode by NANDing an inverted least significant bit, and the remaining bits of the page mode signal inputted from the external circuit.

2. The address translation unit according to claim 1, wherein each of the tag interface means and the data interface means maintains some of the data inputted from the linear address and the physical address, respectively, and converts remaining unused data into "1" or "0" in response to the page mode select signal to output the effective tag data and the effective physical data, respectively.

3. The address translation unit according to claim 1, wherein the tag interface means comprises:

a delay means for outputting with a delay an upper data of the data inputted from the linear address, the upper data having as many bits as used in the page mode supporting the smallest page count among the plurality of page modes;

a first address value deciding means for transferring a first lower one bit following the upper data inputted to the delay means or outputting any value in response to the second control signal;

a second address value deciding means for transferring a second lower one bit following the first lower one bit or outputting any value in response to the second control signal and the third control signal; and a third address value deciding means for transferring the remaining bits following the second lower one bit or outputting any value in response to the first control signal.

4. The address translation unit according to claim 1, wherein the data interface means comprises:

a delay means for outputting with a delay an upper data of the data inputted from the physical address, the upper data having as many bits as used in the page mode supporting the smallest page count among the plurality of page modes;

a first address value deciding means for transferring a first lower one bit following the upper data inputted to the delay means or outputting any value in response to the second control signal;

a second address value deciding means for transferring a second lower one bit following the first lower one bit or outputting any value in response to the second control signal and the third control signal; and a third address value deciding means for transferring the remaining bits following the second lower one bit or outputting any value in response to the first control signal.

5. The address translation unit according to claim 3, wherein the delay means connects at least two inverters in series.

6. The address translation unit according to claim 3, where each of the first address value deciding means, the second address value deciding means and the third address value deciding means comprises:

a third NAND means for NANDing an inputted signal; and an inverting means for reversing an output of the third NAND means.

7. The address translation unit according to claim 4, where each of the first address value deciding means, the second address value deciding means and the third address value deciding means comprises:

a third NAND means for NANDing an inputted signal; and an inverting means for reversing an output of the third NAND means.

* * * * *